No. 745,925. PATENTED DEC. 1, 1903.
H. C. STRINGFELLOW.
COTTON CHOPPER.
APPLICATION FILED MAR. 7, 1903.
NO MODEL. 3 SHEETS—SHEET 1.
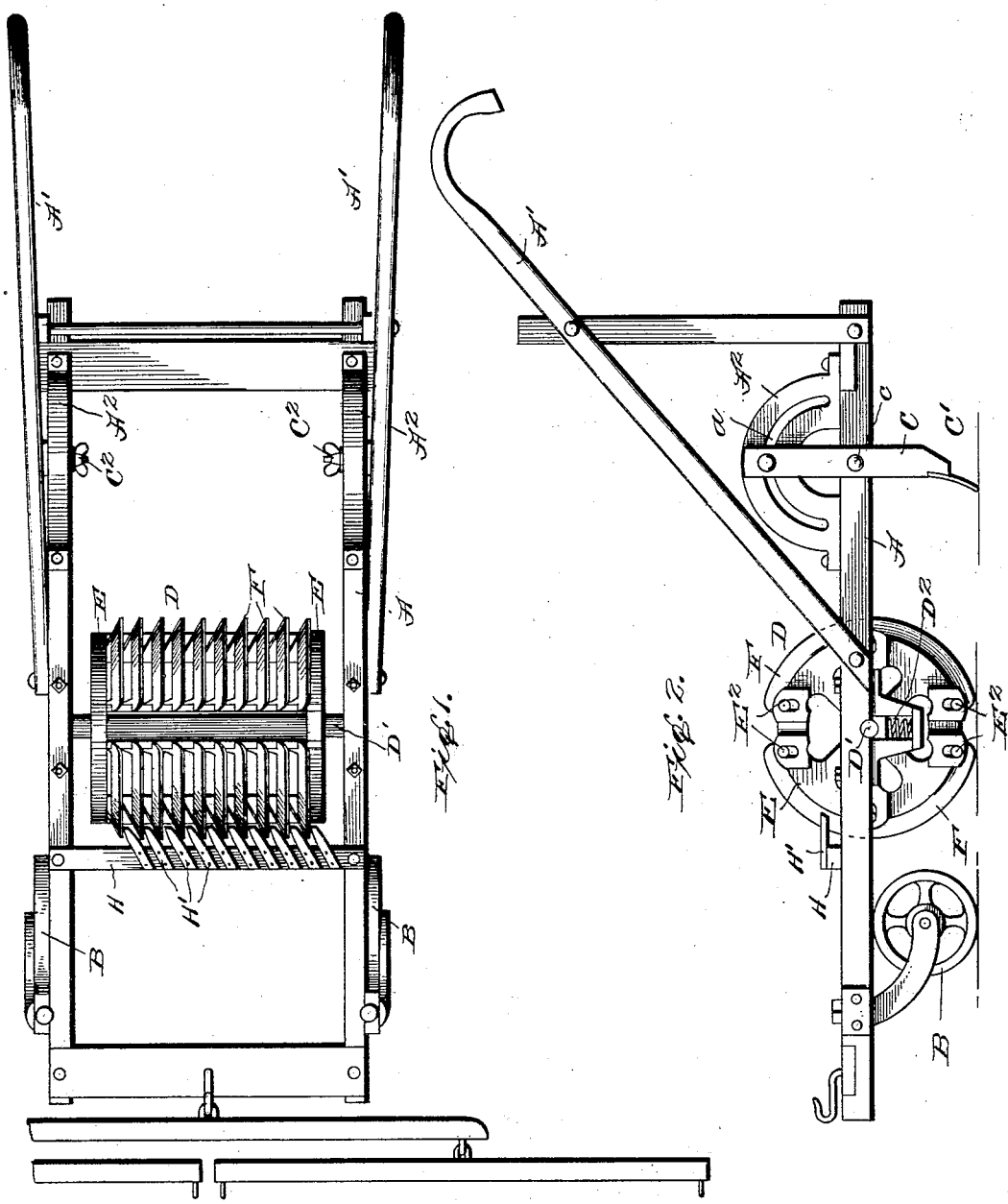
Witnesses
Inventor
H. C. Stringfellow,
by Wilkinson & Fisher
Attorneys.

No. 745,925. PATENTED DEC. 1, 1903.
H. C. STRINGFELLOW.
COTTON CHOPPER.
APPLICATION FILED MAR. 7, 1903.
NO MODEL. 3 SHEETS—SHEET 2.
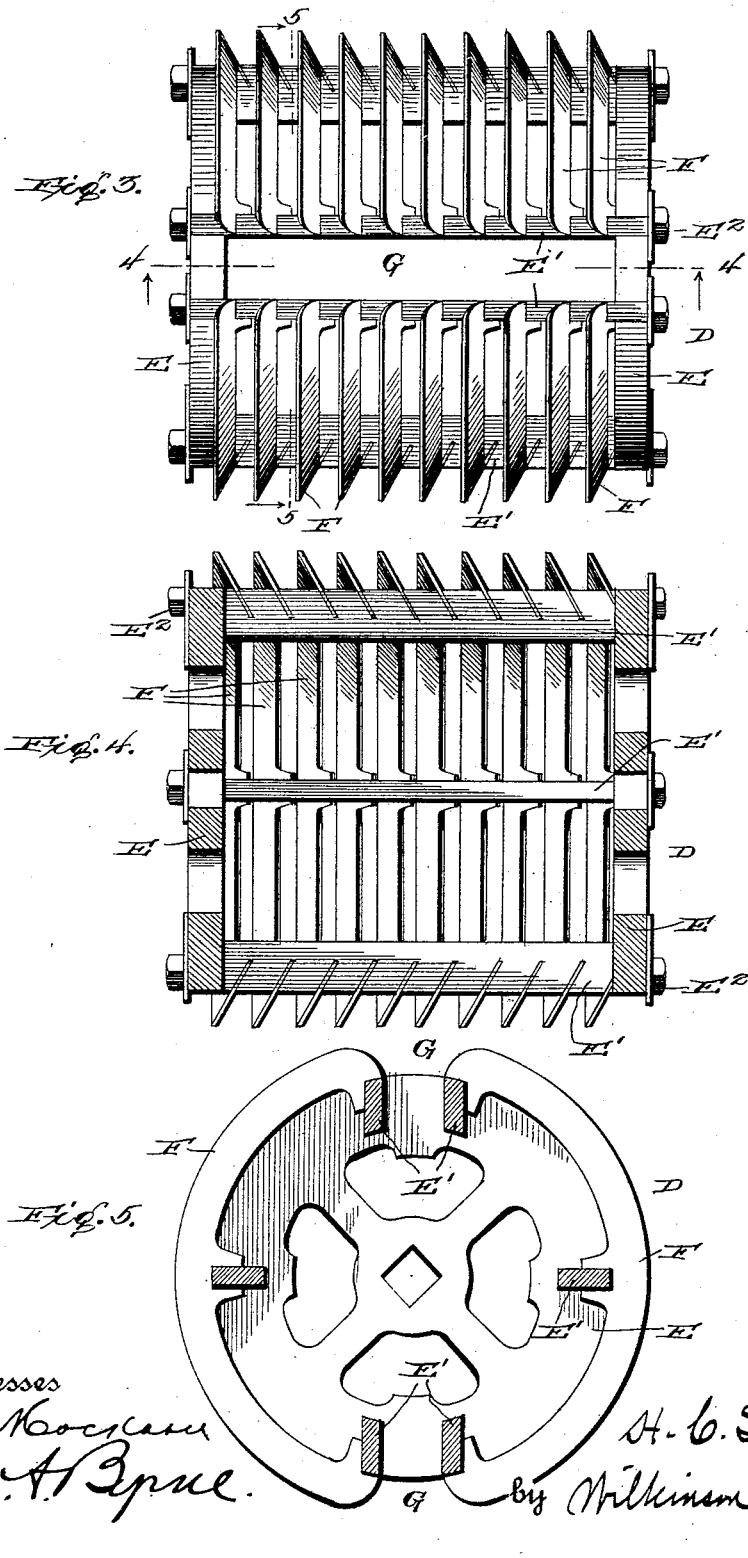

No. 745,925. PATENTED DEC. 1, 1903.
H. C. STRINGFELLOW.
COTTON CHOPPER.
APPLICATION FILED MAR. 7, 1903.
NO MODEL. 3 SHEETS—SHEET 3.

Witnesses
Inventor
H. C. Stringfellow,
by Wilkinson & Fisher,
Attorneys.

No. 745,925. Patented December 1, 1903.

UNITED STATES PATENT OFFICE.

HOWARD C. STRINGFELLOW, OF SHREVEPORT, LOUISIANA.

COTTON-CHOPPER.

SPECIFICATION forming part of Letters Patent No. 745,925, dated December 1, 1903.

Application filed March 7, 1903. Serial No. 146,730. (No model.)

*To all whom it may concern:*

Be it known that I, HOWARD C. STRINGFELLOW, a citizen of the United States, residing at Shreveport, in the parish of Caddo and State of Louisiana, have invented certain new and useful Improvements in Cotton-Choppers; and I do hereby declare the following to be a full, clear, and exact description of the invention, such as will enable others skilled in the art to which it appertains to make and use the same.

My invention relates to improvements in cotton-choppers; and it consists more especially in an improved form of chopper-wheel with interrupted knives arranged on the periphery thereof substantially transverse to the axis of the wheel.

My invention also consists in certain novel combinations and arrangements of parts that will hereinafter be described and claimed.

Reference is had to the accompanying drawings, in which the same parts are indicated by the same letters throughout the several views.

Figure 6:
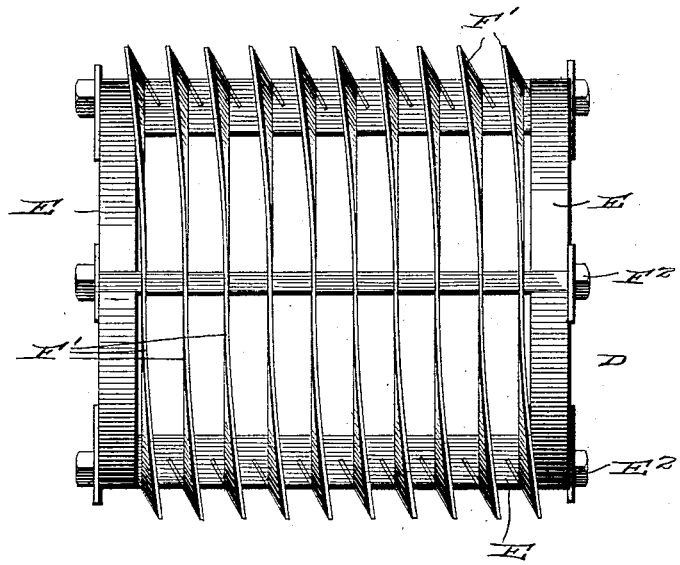
Figure 7:
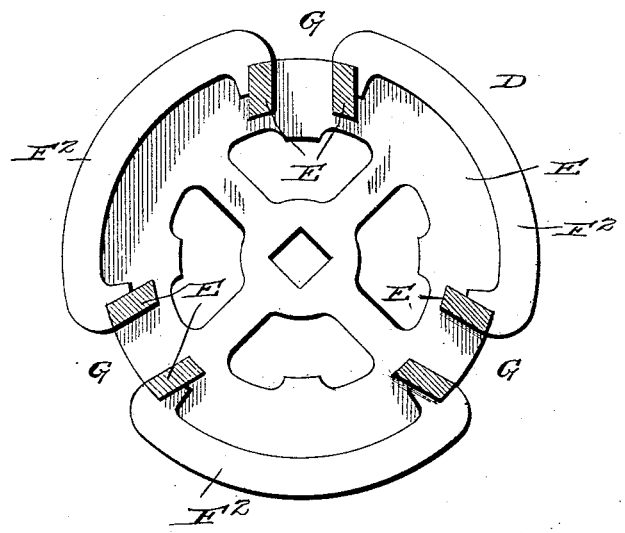

Figure 1 is a plan view of the implement. Fig. 2 is a side elevation. Fig. 3 is a detail showing the chopping-wheel detached. Fig. 4 is a section along the line 4 4 of Fig. 3 and looking in the direction of the arrows. Fig. 5 is a section along the line 5 5 of Figs. 3 and 4 and looking in the direction of the arrows. Fig. 6 is a side elevation of a modified form of wheel; and Fig. 7 is a section of a modified form of wheel, showing three breaks in the knives instead of two, as in the other figures.

A represents the side sills or beams of the frame of the machine, to which the handles A' are secured in the usual way.

B B are guide-wheels which run along the ground in front of the chopping-wheel. The standard C is pivoted, as at c, to the beam A, and its upper end is adjustably bound against the clamp-piece A² by the clamp C², which passes through the curved slot a. The standard C may carry a sweep or shovel-plow C', and this may be thrown out of engagement by swinging the standard backward or forward about its pivot and clamping it in the desired position. Moreover, it may be adjusted in this way to cut to the desired depth.

D represents the chopping-wheel, which, as shown in Figs. 1 and 4, is provided with a series of curved knives F, mounted on the cross-pieces E', spanning the heads E. These heads are held together by bolts E². These knives are interrupted, as at G. In Figs. 1 to 6 I have shown two such interruptions; but the knives may be divided in three segments, as shown in Fig. 7, or any other desired number of segments.

H' represents scrapers or cleaning-teeth made fast to the cross-piece H to clean out any earth, grass, or any matter that may tend to clog the knives.

In the form of device shown in Fig. 6 the knives are slightly spiral, while in that shown in Figs. 2 to 5 the knives are tilted at an angle relative to the axis of the wheel. In either case the operation of the cotton-chopper is the same. The implement is dragged along over the ground, which will cause the knives to pulverize the surface of the soil, destroying weeds and grass, and will also cut out the cotton-stalks, except where the breaks G between the knives pass over the ground. At this portion of the path of the wheel the cotton-plants are undisturbed, and thus the plants will be cut out at regular intervals. Any further thinning out, if necessary, can be done by hand.

If it is desired to scrape off the soil or to stir up the same at either side of the cotton-row, scrapers or shovel-plows C', respectively, may be used.

Having thus described my invention, what I claim, and desire to secure by Letters Patent of the United States, is—

1. In a cotton-chopper, the combination with a frame, of a chopping-wheel mounted in said frame, and provided with a plurality of knives arranged transversely of the axis of the wheel and interrupted at regular intervals on the periphery of the wheel, the said knives being arranged parallel, and tilted relative to the periphery of the wheel, substantially as and for the purposes described.

2. In a cotton-chopper, the combination with a frame, of a chopping-wheel mounted therein transversely thereof, the said chopping-wheel being provided with a plurality of knives arranged transversely of the axis of the wheel and interrupted at regular intervals to form blanks or open spaces, the said knives being arranged parallel, and tilted relative to the periphery of the wheel, substantially as and for the purposes described.

3. In a cotton-chopper, the combination with a frame, of a chopping-wheel mounted therein, the said chopping-wheel being provided with a plurality of knives arranged transversely of the axis of the wheel and interrupted at regular intervals to form open spaces, the said knives being arranged parallel, and tilted relative to the periphery of the wheel, and a cross-piece secured to said frame, with cleaning-teeth secured to said cross-piece and projecting between said knives, substantially as and for the purposes described.

4. In a cotton-chopper, the combination with a frame, of a chopping-wheel mounted in said frame and provided with a plurality of knives set at an angle to and arranged transversely of the axis of the wheel and interrupted at regular intervals on the periphery of the wheel, the said knives being arranged parallel, and tilted relative to the periphery of the wheel, substantially as and for the purposes described.

5. In a cotton-chopper, the combination with a frame, of a chopping-wheel mounted therein, the said chopping-wheel being provided with a plurality of knives set at an angle to and arranged transversely of the axis of the wheel and interrupted at regular intervals to form the open spaces, the said knives being arranged parallel, and tilted relative to the periphery of the wheel, and a cross-piece secured to said frame, with cleaning-teeth secured to said cross-piece and projecting between said knives, substantially as and for the purposes described.

In testimony whereof I affix my signature in presence of two witnesses.

HOWARD C. STRINGFELLOW.

Witnesses:
J. D. WILKINSON,
P. YOURSE.